(12) United States Patent
Perfetti et al.

(10) Patent No.: US 9,534,943 B2
(45) Date of Patent: Jan. 3, 2017

(54) MEASURING TUBE FOR MAGNETO-INDUCTIVE FLOW-MEASURING SYSTEMS

(71) Applicant: KROHNE AG, Basel (CH)

(72) Inventors: Christine Perfetti, Chatuzange le Goubet (FR); Josef Neven, Mours St. Eusèbe (FR)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 15/030,145

(22) PCT Filed: Oct. 16, 2014

(86) PCT No.: PCT/EP2014/002785
§ 371 (c)(1),
(2) Date: Apr. 18, 2016

(87) PCT Pub. No.: WO2015/055309
PCT Pub. Date: Apr. 23, 2015

(65) Prior Publication Data
US 2016/0245679 A1   Aug. 25, 2016

(30) Foreign Application Priority Data

Oct. 17, 2013 (DE) .......................... 10 2013 017 286
Nov. 18, 2013 (DE) .......................... 10 2013 019 182

(51) Int. Cl.
*G01F 1/58*        (2006.01)
(52) U.S. Cl.
CPC .................................... *G01F 1/584* (2013.01)

(58) Field of Classification Search
CPC ..................................... G01F 1/00; G01F 1/58
(Continued)

(56) References Cited

U.S. PATENT DOCUMENTS 4,195,515 A    4/1980 Smoll
4,346,604 A    8/1982 Snook et al.
(Continued)

FOREIGN PATENT DOCUMENTS

DE        36 43 755 C1    10/1992
DE        692 32 633 T2    9/2002
(Continued)

*Primary Examiner* — Jewel V Thompson
(74) *Attorney, Agent, or Firm* — David S. Safran

(57) ABSTRACT

A measuring tube for magneto-inductive flowmeter systems, having a measuring tube for the flow of an electrically conductive medium and a magnetic field generating device for generating a magnetic field, at least two measuring electrodes which tap the measurement voltage induced in the electrically conductive medium and preferably an evaluation unit. The measuring electrodes have externally accessible measuring contacts, wherein the measuring tube forms a first functional unit with the measuring electrodes, and mating contacts corresponding to the measuring contacts of the measuring electrodes, the magnetic field generating device and an evaluation unit, if present, form a second functional unit. The measuring contacts of the measuring electrodes are provided on the measuring tube in such a manner that they can be brought into electrically conductive contact with the mating contacts by a movement which runs substantially perpendicular to the direction of the magnetic field and is substantially only translational.

10 Claims, 4 Drawing Sheets

(58) Field of Classification Search
  USPC .......................... 73/861.12, 861.19; 702/45
  See application file for complete search history.

(56) References Cited

U.S. PATENT DOCUMENTS

| | | | |
|---|---|---|---|
| 4,881,413 | A | 11/1989 | Georgi et al. |
| 5,220,841 | A | 6/1993 | Brown et al. |
| 6,092,428 | A | 7/2000 | Brockhaus |
| 6,453,754 | B1 | 9/2002 | Florin |
| 6,564,612 | B2 | 5/2003 | Brockhaus |
| 6,598,487 | B1 * | 7/2003 | Marsh ................. G01F 1/584 |
| | | | 73/861.11 |
| 6,804,613 | B2 * | 10/2004 | Ishikawa ............... G01F 1/60 |
| | | | 141/94 |
| 7,117,750 | B2 * | 10/2006 | Brockhaus ............ G01F 1/60 |
| | | | 73/861.12 |
| 7,827,870 | B2 * | 11/2010 | Cottam ............... G01F 1/3227 |
| | | | 73/861.18 |
| 7,971,493 | B2 | 7/2011 | Hencken et al. |
| 8,046,194 | B2 * | 10/2011 | Rufer .................. G01F 1/584 |
| | | | 702/184 |
| 9,285,253 | B2 | 3/2016 | Brockhaus |
| 2007/0220992 | A1 | 9/2007 | Lam |
| 2012/0066301 | A1 | 3/2012 | Holland |

FOREIGN PATENT DOCUMENTS

| | | |
|---|---|---|
| DE | 10 2007 004 826 A1 | 8/2008 |
| EP | 0 704 682 A2 | 4/1996 |
| JP | H 05-23394 A | 2/1993 |
| JP | 2007-071695 A | 3/2007 |

\* cited by examiner

MEASURING TUBE FOR MAGNETO-INDUCTIVE FLOW-MEASURING SYSTEMS

BACKGROUND OF THE INVENTION

Field of the Invention

The invention relates to a measuring tube for a magneto-inductive flow measuring system, wherein the flow measuring system has the measuring tube for the flow of an electrically conductive medium and a magnetic field generator for generating a, preferably alternating, magnetic field running at least also perpendicular to the longitudinal axis of the measuring tube, at least two measuring electrodes tapping the measuring voltage induced in the electrically conductive medium, preferably in contact with the medium and preferably an evaluation unit, wherein the measuring electrodes have accessible measuring contacts on the outside of the measuring tube and the measuring tube with the measuring electrodes forming a first functional unit and counter contacts corresponding to the measuring contacts of the measuring electrodes, the magnetic field generator and the evaluation unit (insofar such is present) forming a second functional unit and wherein the counter contacts, the magnetic field generator and the evaluation unit (insofar such is present) are provided in a measuring system housing.

Description of Related Art

Magneto-inductive flow-measuring systems have been known extensively for decades in the prior art. Reference is made, as an example, to the citation "Technische Durchflussmessung" from Dr.-Ing. K. W. Bonfig, $3^{rd}$ Edition, Vulkan-Verlag Essen, 2002, pages 123 to 167 and to the citation "Grundlagen Magnetisch-Induktive Durchflussmessung" from Dipl.-Ing. Friedrich Hoffmann, $3^{rd}$ Edition, 2003, publication of the company KROHNE Messtechnik GmbH & Co. KG.

The principle of a magneto-inductive flow-measuring system for flow measurement of a flowing medium goes back to Faraday, who, in 1832, suggested using the principle of electromagnetic induction in the measurement of flow rates of an electrically conductive medium.

According to Faraday's law of induction, an electrical field intensity develops perpendicular to the direction of flow of the medium in a flowing, electrically conductive medium interfused by a magnetic field and perpendicular to the magnetic field. Faraday's law of induction is utilized in magneto-inductive flow-measuring systems in that a temporally-alternating magnetic field is usually generated during measurement by means of a magnetic field generator, which usually has at least one magnetic field coil and the magnetic field at least partially interfuses the electrically conductive medium flowing through the measuring tube. Thereby, the generated magnetic field has at least one component perpendicular to the longitudinal axis of the measuring tube or perpendicular to the direction of flow of the medium.

As stated above, the at least one magnetic field generator "for generating a magnetic field running at least also perpendicular to the longitudinal axis of the measuring tube" belongs to the magneto-inductive flow-measuring system, then it is indicated here that the magnetic field is namely preferable perpendicular to the longitudinal axis of the measuring tube or perpendicular to the direction of flow of the medium, but it is sufficient that one component of the magnetic field runs perpendicular to the longitudinal axis of the measuring tube or perpendicular to the direction of flow of the medium.

In the introduction, it is also stated that the magnetic field generator is intended for generating a, preferably alternating, magnetic field. This expresses that it is not important for the teaching of the invention—in respect to its origin, to its objects and to meeting these objects—that it is an alternating magnetic field, even when magneto-inductive flow-measuring systems predominately have magnetic field generators that generate an alternating magnetic field.

It is also mentioned in the introduction that at least two measuring electrodes, preferably in contact with the medium, tapping the measuring voltage induced in the electrically conductive medium belong to the magneto-inductive flow-measuring systems of the type being discussed here. Preferably, the virtual connection line of the two measuring electrodes runs at least essentially perpendicular to the direction of the measuring tube perpendicular to the longitudinal axis of the magnetic field interfusing the measuring tube. In particular, the measuring electrodes can be provided in such a manner that their virtual connection line actually—more or less—runs perpendicular to the longitudinal axis of the magnetic field interfusing the measuring tube.

Finally, it is described in the introduction that the measuring electrodes are such that they can be in contact with the medium. Effectively, of course, the electrical field intensity generated by induction in flowing, electrically conductive medium can be tapped by measuring electrodes that are in direct, i.e., galvanic, contact to the medium as a measuring voltage. However, there are magneto-inductive flow-measuring systems, in which the measuring voltage is not tapped by measuring electrodes that have direct, i.e., galvanic, contact to the medium, but rather the measuring voltage is capacitively determined.

Two different designs of magneto-inductive flow-measuring systems are possible, namely a first design, in which both functional units, i.e., the measuring tube on the one hand and the magnetic field generator on the other hand, are separate components that result in a functional magneto-inductive flow-measuring system when first brought together and a second design, in which the two functional units, i.e., the measuring tube and the magnetic field generator are already brought together in-factory, i.e., components made functional in-factory to result in an already functional magneto-inductive flow-measuring system from the factory.

In the following, only the first design of a magneto-inductive flow-measuring system is described, i.e., the design in which the measuring tube, on the one hand, and the magnetic field generator, on the other hand, are initially separate components that result in a functional magneto-inductive flow-measuring system when they are brought into function with one another. What is described in the following, however, is easily applicable for the second design of magneto-inductive flow-measuring systems, in which both functional units, the measuring tube and the magnetic field generator, are already brought into function with one another in-factory, i.e., components of an already functional magneto-inductive flow-measuring system from the factory.

As an example, reference is made to known magneto-inductive flowmeters from the prior art in German Patent DE 692 32 633 C2, German Patent Application DE 199 07 864 A1 which corresponds to U.S. Pat. No. 6,453,754 B1, German Patent Application DE 100 64 738 B4 which corresponds to U.S. Pat. No. 6,564,612 B2, German Patent Application DE 102 43 748 A1 which corresponds to U.S. Pat. No. 6,804,613 B2, German Patent Application DE 10 2008 005 258 A1 which corresponds to U.S. Pat. No. 7,971,493 B2 and German Patent Application DE 10 2011

112 703 A1 which corresponds to U.S. Patent Application Publication 2012/0066301 A1 as well as European Patent Application EP 0 704 682 A1 and European Patent Application EP 0 834 057 A1 which corresponds to U.S. Pat. No. 6,092,428.

Normally, a magnetic field coil belongs to the magnetic field generator in magneto-inductive flow-measuring systems of the type being discussed here. As a rule, this magnetic field coil has a coil core and two pole shoes are adjacent to the coil core on both sides. The coil core and the pole shoes usually consist of magnetic, conductive material, i.e., of material having a large permeability, and the pole shoes extend beyond the measuring tube on both sides. Thus, the coil core, the poles shoes adjacent to both sides of the coil core and the air gap formed between the pole shoes, in which the measuring tube is located—in the functional state—belong to the magnetic circuit, which is important and necessary for the functioning of the magneto-inductive flow-measuring system being discussed here.

As described in detail, the longitudinal axis of the measuring tube, the direction of the magnetic field and the virtual connection line of the two measuring electrodes form a right-angled tripod. If the longitudinal axis is the X-axis, the direction of the magnetic field the Y-axis, then the virtual connection line of the two measuring electrodes is the Z-axis of the right-angled tripod; the virtual connection line of the two measuring electrodes thus runs perpendicular to the longitudinal axis of the measuring tube as well as perpendicular to the direction of the magnetic field.

SUMMARY OF THE INVENTION

A problem results, which is described above, in that one measuring electrode with its measuring contact (and corresponding counter contact) is located on one side of the measuring tube and the other measuring electrode with its measuring contact (and corresponding counter contact) is located on the other side of the measuring tube. This has constructional as well as connectivity-related disadvantages and the elimination of these disadvantages is the object of this invention.

The measuring tube according to the invention in which the above derived and described object is met is initially and essentially characterized in that the measuring contacts of the measuring electrodes are provided on the measuring tube in such a manner and the counter contacts corresponding to the measuring contacts of the measuring electrodes are arranged in the measuring system in such a manner that the measuring contacts can be brought into electrical contact with the counter contacts by means of an essentially translational movement essentially perpendicular to the direction of the magnetic field. This teaching according to the invention is advantageous for the first design described above of the magneto-inductive flow-measuring system, in which the measuring tube, on the one hand, and the magnetic field generator, on the other hand, are initially separate components that first result in a functional magneto-inductive flow-measuring system when they are brought into function with one another as well as advantageous for the second design, in which the measuring tube, on the one hand, and the magnetic field generator, on the other hand, are components of an already functional magneto-inductive flow-measuring system from the factory. In both cases, it is implemented, in particular, that each of the two measuring contacts of the measuring tube, which have to be initially provided for function, on the one hand, on one side of the measuring tube and, on the other hand, on the other side of the measuring tube, are easily reachable from one side by the corresponding counter contact or can be brought into electro-conductive contact with the corresponding counter contact.

In detail, there are various possibilities for designing and further developing the described first teaching of the invention.

A first preferred design of the measuring tube according to the invention is characterized in that the measuring contacts of the measuring electrodes are designed and provided on the measuring tube in such a manner that they can be brought into electrical contact with the counter contacts by means of an essentially translational movement essentially perpendicular to the direction of the magnetic field. This design is intended for a second functional unit of magneto-inductive flow-measuring systems of the type being discussed here, in which the counter contact assigned to the above-described measuring contact is extended until it comes into contact with the corresponding measuring contact. Thus, in this design, the counter contact, the second functional unit, which has to come into electro-conductive contact with the measuring contact, which is provided on the side of the measuring tube facing away from the magnetic coil, either has to practically reach over or under the entire diameter of the measuring tube.

Another preferred design of the measuring tube according to the invention is characterized in that the measuring contact of the measuring electrode provided on the side of the measuring tube is extended at least on one side, in the peripheral direction of the measuring tube. This design requires a second functional unit of magneto-inductive flow-measuring systems of the type being discussed here, in that the counter contact assigned to the above-described measuring contact is extended until is comes into contact with the corresponding measuring contact. In this design, the measuring contact is, thus, designed as a circular arc. Thereby, the circular arc-shaped measuring contact can encompass somewhat less than 180°, namely so much less that is does not come into contact with the measuring contact of the other measuring electrode.

What was described above for the measuring contact of the measuring electrode provided on the side of the measuring tube facing away from the magnetic coil, naturally also relates only to the measuring contact of the measuring electrode provided outside of the measuring tube. Within the measuring tube, the measuring electrode, whose outer measuring contact is designed in a particular manner, as is the other measuring electrode, is designed according to the extensive prior art.

In magneto-inductive flow-measuring systems, the measuring tube often has at least one circular ground electrode. If such a ground electrode is provided, the teaching of the invention can also be implemented in that the ground electrode forms one of the two measuring electrodes and is designed in such a manner as is described above in detail.

In a magneto-inductive flow-measuring system, for which the measuring tubes according to the invention are intended, each of the two counter contacts can be assigned a test contact in the second functional unit. Thereby, both test contacts, on the one hand, and both measuring contacts of the measuring tube, on the other hand, are designed and arranged in such a manner that the test contacts have electro-conductive contact to the assigned counter contacts when and only when the counter contact also has electro-conductive contact to the assigned measuring contacts. For this design of magneto-inductive flow-measuring systems, the measuring tube is designed in such a manner that each of the measuring contacts has a test counter contact galvanically connected to it. This can be implemented in a simple manner in that each of the two test counter contacts and the assigned measuring contact are integrally formed.

It is not unusual that magneto-inductive flow-measuring systems of the type being discussed here are required for measuring tubes with differing flow cross-sections, i.e., having differing inner diameters. Having to use different magneto-inductive flow-measuring systems for this is not desired for the implemented use or by the user. Thus, a further teaching of the invention, which is of particular importance in conjunction with the above-described teaching of the invention, but also disassociated therefrom, is based on measuring tubes having differing flow cross-sections, i.e., differing inner diameters being readily insertable or being able to be inserted.

Measuring tubes with differing flow cross-sections, i.e., with differing inner diameters, can be easily used when the differing measuring tubes each have the same outer diameter and the same measuring contacts, i.e., only in respect to the flow cross-sections, which means only the inner diameters are different.

The above-described implementation of easily insertable measuring tubes with differing flow cross-sections, i.e., with differing inner diameters, can be a problem in terms of manufacture. Consequently, another implementation of easily insertable measuring tubes having differing flow cross-sections, i.e., with differing inner diameters is characterized in that the differing insertable or inserted measuring tubes each have the same or corresponding measuring contacts. Thus, it is sufficient when the measuring tubes are the same, or at least functionally the same, regardless of the flow cross-section, i.e., regardless of the inner diameter, at the point where their measuring contacts are brought into electro-conductive contact with the corresponding counter contacts in the second functional unit of the magneto-inductive flow-measuring system of the type being discussed here.

If measuring tubes with differing flow cross-sections are used, i.e., with differing inner diameters, the user can take this into consideration. He can enter the flow cross-section, i.e., the inner diameter of the insertable or inserted measuring tube, into the evaluation unit, which can be a part of a magneto-inductive flow-measuring system according to the invention, but can also be implemented separate from a magneto-inductive flow-measuring system according to the invention. However, a particularly preferred design of a measuring tube is characterized in that it is provided with an inner diameter revealing member. Of course, this design only makes sense when an inner diameter query member is assigned to the inner diameter revealing member of the measuring tube in the measuring system housing in the second functional unit of the magneto-inductive flow-measuring system of the type being discussed here. In this preferred design, thus, the effective flow cross-section, i.e., the effective inner diameter is automatically taken into consideration for flow measurement with the insertion of the correspondingly equipped measuring tube.

As described, there are various possibilities for designing and further developing the magneto-inductive flow-measuring system according to the invention as will become apparent from the following description of embodiments in conjunction with the accompanying drawings.

DETAILED DESCRIPTION OF THE INVENTION

Figure 1:
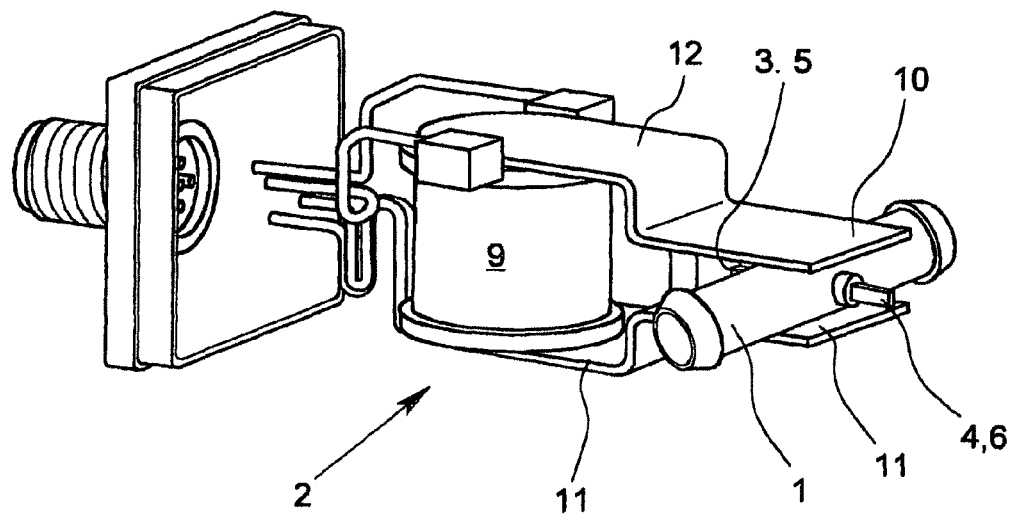
FIG. 1 shows a relatively schematic, basic construction of a magneto-inductive flow-measuring system.
Figure 4:
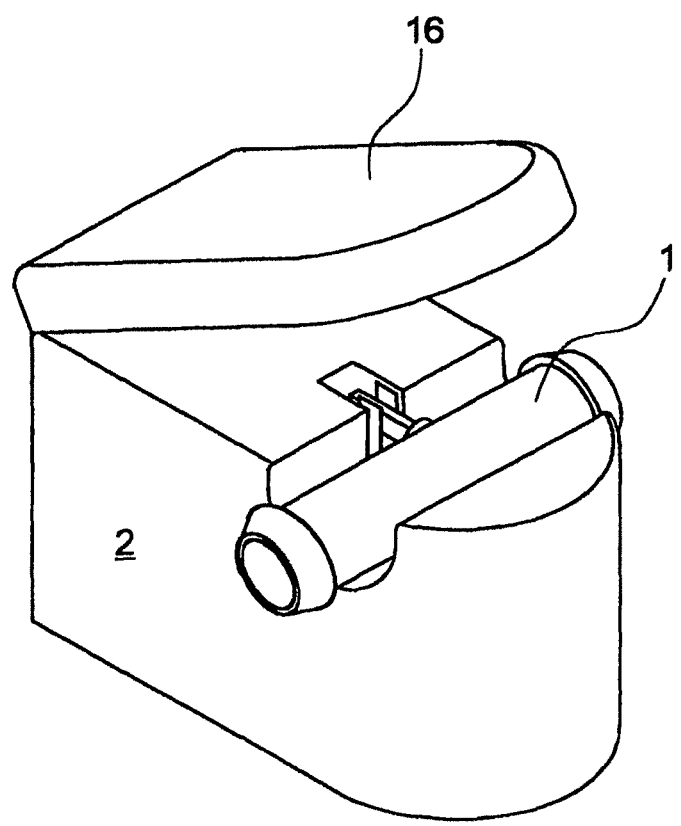
FIG. 4 shows a very schematic, possible embodiment of a magneto-inductive flow-measuring system with an inserted measuring tube
Figure 5:
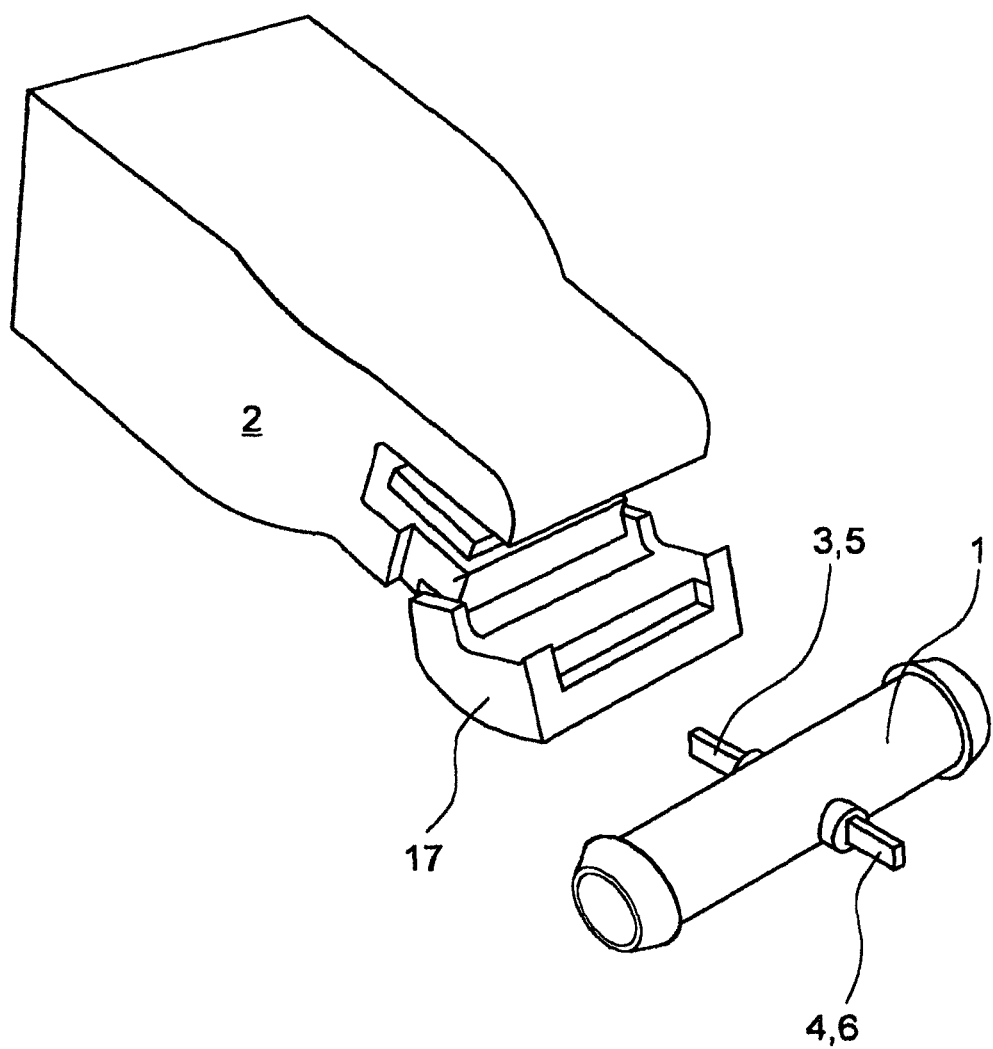
FIG. 5 shows another embodiment of a magneto-inductive flow-measuring system, in which a measuring tube according to the invention has not yet been inserted.

Initially and essentially, a measuring tube 1 for the flow of an electrically conductive medium and a magnetic field generator 2 for generating a, preferably alternating, magnetic field running at least also perpendicular to the longitudinal axis of the measuring tube 1 and two measuring electrodes 3, 4 preferably in contact with the medium, tapping measuring voltage induced in the electro-conductive medium belong to the magneto-inductive flow-measuring system only schematically shown in FIGS. 1, 4 and 5, wherein the measuring electrodes 3, 4 have measuring contacts 5, 6 accessible on the outside of the measuring tube 1.

An evaluation unit and a measuring system housing are basically also part of the magneto-inductive flow-measuring system according to the invention. The evaluation unit (not shown) can be a part of a magneto-inductive flow-measuring system, or the evaluation unit can be implemented as a separate component.

The measuring tube 1 according to the invention with the measuring electrodes 3, 4 and the measuring contacts 5 and 6 forms a first functional unit and counter contacts 7, 8 corresponding to the measuring contacts 5, 6 of the measuring electrodes 3, 4, the magnetic field generator 2 and the evaluation unit (insofar as such is present) form a second functional unit. The counter contacts 7, 8, the magnetic field generator 2 and the evaluation unit (insofar as such is present) are provided in the measuring system housing.

In the magneto-inductive flow-measuring system schematically shown in FIG. 1, a magnetic field coil 9, which has a coil core not shown in detail, belongs to the magnetic field generator 2. Pole shoes 10, 11 are adjacent to the (not shown) coil core on both sides. The (not shown) coil core and the pole shoes 10, 11 usually consist of magnetic, conductive material and, as indicated in FIG. 1, the pole shoes 10, 11 extend beyond the measuring tube 1 on both sides.

As described further above, two different embodiments are possible for the magneto-inductive flow-measuring system, namely a first embodiment in which the two above-described functional units are separate components, which result in a functional magneto-inductive flow-measuring system first when they are brought into function with one another and a second embodiment, in which both above-described functional units are already brought into function with one another in-factory, i.e., components brought into function with one another in-factory of an already functional magneto-inductive flowmeter.

First, it holds true for the shown magneto-inductive flow-measuring system that the measuring contacts 5, 6 of the measuring electrodes 3, 4 are provided on the measuring tube 1 in such a manner and the counter contacts 7, 8 corresponding to the measuring contacts 5, 6 of the measuring electrodes 3, 4 are arranged in the (not shown) measuring system housing in such a manner that the measuring contacts 5, 6 can be brought into electrical contact with the counter contacts 7, 8 by means of an essentially translational movement essentially perpendicular to the direction of the magnetic field. This can be implemented in detail in various ways.

Figure 2:
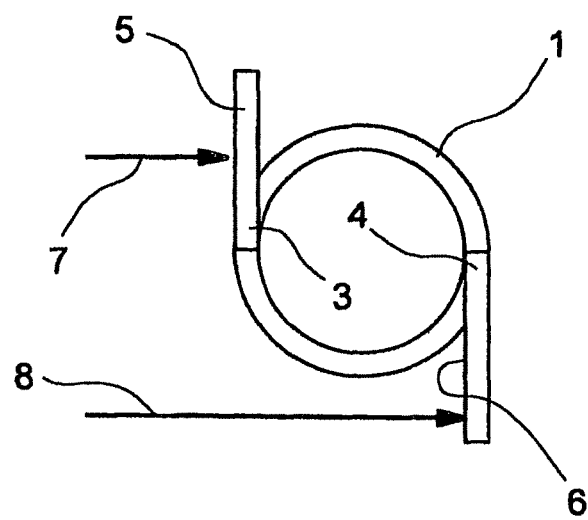
FIG. 2 is a very schematic representation of one teaching according to the invention.
Figure 3:
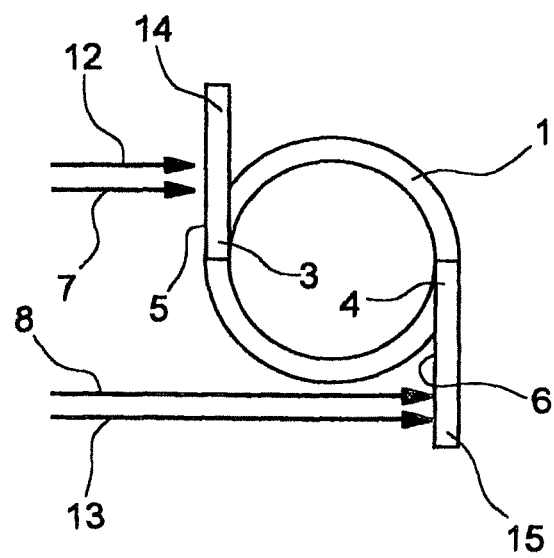
FIG. 3 is similar to FIG. 2, but is a very schematic representation of a further teaching according to the invention.

A first implementation possibility is indicated in FIGS. 2 and 3. Thereby, the measuring contact 6 of the measuring electrode 4 provided on the side of the measuring tube 1 facing away from the magnetic field coil 9 is extended at least on one side parallel to the direction of the magnetic field and the counter contact 8 assigned to the above-described measuring contact 6 is extended until it comes into contact with the corresponding measuring contact 6. Another, not shown, implementation possibility is characterized in that the measuring contact 6 of the measuring electrode 4 provided on the side of the measuring tube 1 facing away from the magnetic field coil 9 is extended at least on one side in the peripheral direction of the measuring tube and the counter contact assigned to the measuring contact described above is extended until it comes into contact with the corresponding measuring contact.

The measuring tube in magneto-inductive flow-measuring systems often has at least one preferably circular ground electrode. In such an embodiment, the ground electrode can form one of the two measuring electrodes.

FIG. 3 serves to describe a teaching of the invention, which is of particular importance in conjunction with what has been described above, but also disassociated therefrom. Thereby, it is namely provided that each of the two counter contacts 7, 8 is assigned a test contact 12, 13 and that the two test contacts 12, 13, on the one hand, and the two measuring contacts 5, 6 of the measuring tube, on the other hand are designed and arranged in such a manner that the test contacts 12, 13 have electro-conductive contact to the assigned counter contacts 7, 8 when and only when the counter contact 7, 8 also has electro-conductive contact to the assigned measuring contacts 5, 6. Thereby, the test contacts 12, 13 are assigned a test counter contact 14, 15 galvanically connected to the assigned measuring contacts 5, 6. This can be implemented in a simple manner in that each of the two test counter contacts 14, 15 and the respective assigned measuring contact 5, 6 are integrally formed.

As described above, magneto-inductive flow-measuring systems having measuring tubes with differing flow cross-sections, i.e., with different inner diameters are often required. In this context, it is of particular importance to implement a magneto-inductive flow-measuring system with measuring tubes 1 having differing flow cross-sections, i.e., differing inner diameters being readily insertable or being able to be inserted. A significant teaching of the invention is, thus, to provide a plurality of measuring tubes having differing flow cross-sections, i.e., differing inner diameters, which can be easily assembled, put together, combined with second functional units of the magneto-inductive flow-measuring systems being discussed here to result in functional magneto-inductive flow-measuring systems.

Measuring tubes 1 of a plurality of measuring tubes 1 having differing flow cross-sections, i.e., with differing inner diameters, can be easily used when the differing measuring tubes 1 each have the same outer diameter and the same measuring contacts 5, 6, thus, when the measuring tubes 1 only differ in respect to the flow cross-section, i.e., in respect to the inner diameter.

Another implementation of easily insertable measuring tubes 1 of a plurality of measuring tubes 1 having differing flow cross-sections, i.e., with differing inner diameters, is characterized in that the differing insertable or inserted measuring tubes 1 each have the same or corresponding measuring contacts 5, 6. It is, namely, sufficient when the measuring tubes 1 of a plurality of measuring tubes 1 are the same, or at least functionally the same, regardless of the flow cross-section, i.e., regardless of the inner diameter, at the point where their measuring contacts 5, 6 are brought into electro-conductive contact with the corresponding counter contacts 7, 8 in the second functional unit of the magneto-inductive flow-measuring system of the type being discussed here.

In magneto-inductive flow-measuring systems, the user can take into consideration the use of measuring tubes with differing flow cross-sections, i.e., with differing inner diameters, namely, he can enter the flow cross-section, i.e., the inner diameter of the insertable or inserted measuring tube, into the evaluation unit, which can be a part of a magneto-inductive flow-measuring system but can also be implemented separate from such a magneto-inductive flow-measuring system. However, this is complex, and in particular, can lead to erroneous input. Consequently, a further teaching of the invention it to provide each measuring tube with an inner diameter revealing member. In this embodiment, an inner diameter query member must be provided assigned to the inner diameter revealing member of the measuring tube in the measuring system housing, an embodiment that is not shown, but easily understandable on its own.

It is valid for the embodiment of the magneto-inductive flow-measuring system shown only schematically in FIGS. 4 and 5 that, with the help of a lid 16 (FIG. 4) that can be tilted upward or with the help of a flap 17 that can swing forward, the magneto-inductive flow-measuring system can be opened in such a manner that the measuring tube 1 to be used can be easily inserted with its measuring electrodes 3, 4 and the assigned measuring contacts 5, 6.

Embodiments of magneto-inductive flow-measuring systems that do not have movable parts like the lid 16 in the embodiment in FIG. 4 or the flap 17 in the embodiment in FIG. 5 are preferred over the embodiments shown in FIGS. 4 and 5.

What is claimed is:

1. A Measuring tube for a magneto-inductive flow-measuring system, comprising:
   a measuring tube for a flow of an electrically conductive medium,
   a magnetic field generator for generating a magnetic field running at least perpendicular to the longitudinal axis of the measuring tube,
   at least two measuring electrodes for tapping a measuring voltage induced in the electrically conductive medium,
   wherein the measuring electrodes have measuring contacts that are accessible outside of the measuring tube
   wherein the measuring tube and the measuring electrodes form a first functional unit,
   wherein counter contacts corresponding to the measuring contacts of the measuring electrodes, and the magnetic field generator form a second functional unit, and
   wherein the counter contacts and the magnetic field generator are provided in a measuring system housing,
   wherein the measuring contacts of the measuring electrodes are provided on the measuring tube in such a manner that they are movable into electrical contact with the counter contacts in an essentially translational movement in a direction essentially perpendicular to a direction of the magnetic field.

2. The measuring tube according to claim 1, wherein at least one of the measuring contacts of the measuring electrode extends, at least on one side of the measuring tube, perpendicular to a virtual line connecting the measuring electrodes.

3. The measuring tube according to claim 1, wherein at least one of the measuring contacts of the measuring electrodes extends at least on a side of the measuring tube in a peripheral direction of the measuring tube.

4. The measuring tube according to claim 1, wherein the measuring tube has at least one ring-shaped ground electrode, wherein the ground electrode forms one of the at least two measuring electrodes.

5. The measuring tube according to claim 1, wherein each of the measuring contacts has a test counter contact galvanically connected to it.

6. The measuring tube according to claim 5, wherein each of the test contacts and the assigned measuring contact are integrally formed.

7. The measuring tube according to claim 1, wherein at least the measuring tube is provided with an inner diameter revealing member.

8. A plurality of measuring tubes for magneto-inductive flow-measuring systems, comprising:
   a measuring tube for a flow of an electrically conductive medium,
   a magnetic field generator for generating a magnetic field running at least perpendicular to a longitudinal axis of the measuring tube,
   at least two measuring electrodes tapping a measuring voltage induced in the electrically conductive medium,
   wherein the measuring electrodes have accessible measuring contacts on an outer side of the measuring tube and the measuring tube with the measuring electrodes form a first functional unit,
   wherein counter contacts corresponding to the measuring contacts of the measuring electrodes and the magnetic field generator form a second functional unit,
   wherein the counter contacts and the magnetic field generator are provided in a measuring system housing, and
   wherein the measuring tubes have differing flow cross-sections and are insertable in the second functional unit.

9. The plurality of measuring tubes according to claim 8, wherein the measuring tubes having differing flow cross-sections each have the same outer diameter and the same measuring contacts.

10. The plurality of measuring tubes according to claim 8, wherein the measuring tubes having differing flow cross-sections each have the same or corresponding measuring contacts.

* * * * *